WILLIAM L. HEARD
INVENTOR.

WILLIAM L. HEARD
INVENTOR.

United States Patent Office 3,523,239
Patented Aug. 4, 1970

3,523,239
VOLTAGE REGULATED STEP-UP APPARATUS
William L. Heard, Greenville, Tex., assignor to Systems Engineering Electronics, Inc., Dallas, Tex., a corporation of Texas
Filed Dec. 11, 1967, Ser. No. 689,699
Int. Cl. G05f 1/60
U.S. Cl. 323—20     11 Claims

ABSTRACT OF THE DISCLOSURE

Disclosed is a regulated DC voltage translating circuit providing an essentially constant predetermined output voltage. A transistor switch is utilized for transferring energy from an inductor in the input loop to a storage capacitor and load in the output portion through a diode connected in the forward direction. A unijunction relaxation oscillator establishes the basic frequency of operation of the transistor switch, and voltage and current feedback means responding to fluctuations in the load voltage and load current operate in conjunction with the relaxation oscillator to establish the duration of time the switch is open and closed. The feedback includes a transformer, differential amplifier, and associated resistors and capacitors to control the output of an operational amplifier, which in turn controls the conduction cycles of various transistors, including the transistor switch. Also disclosed is a drive current regulator for the transistor switch to prevent over-driving this transistor.

---

Figure 1:
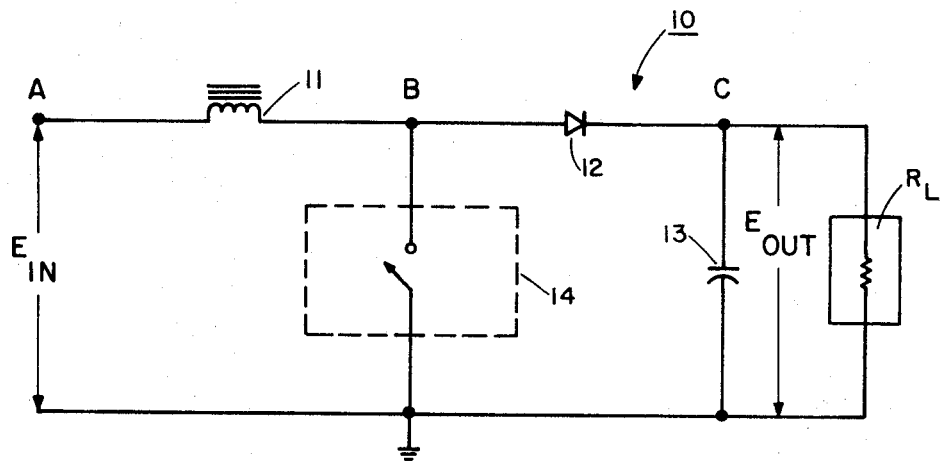

The present invention relates to a DC voltage translating system, and more particularly to a regulated DC voltage step-up transformer, where the predetermined output voltage is independent of load or input voltage variations.

There are many systems and applications within the electronics field which require, as part of their function, the translation of a DC voltage from one level to a higher level. Included among these are power supplies, motor controls, and battery charging from solar cells. Many techniques have been utilized to provide this voltage translation, ranging from simple air and iron core transformers to more complex circuitry employing silicon control rectifiers or transistors as series elements, and DC to DC converters with variable pulse width or duty cycle control for regulation. The difficulty with many of these approaches is that they either lack sufficient voltage regulation or they have undesirably high transient currents in the input circuit and/or low overall efficiency.

It is therefore a primary object of the invention to provide a new and improved design for a DC voltage translating system.

It is another object of the invention to provide a novel DC voltage step-up transformer which produces a predetermined, constant or variable output voltage, independent of input voltage and load variations.

It is a further object of the invention to provide a regulated DC voltage translator having relatively low transient input currents and relatively high efficiency.

It is a still further object of the invention to provide a DC voltage step-up device which utilizes both current and voltage feedback to regulate the switching periods of a transistor switch and thereby furnish an essentially constant output voltage.

In accordance with these and other objects, the present invention is directed to a translator circuit having an inductor in the input portion, a storage capacitor in parallel with a load and connected across the output terminals of the circuit, and a controlled switch for transferring energy from the input to the output of the circuit. When the switch is closed, current builds up in the inductor due to the voltage applied to the input terminals of the circuit, and when the switch is opened, the current which is then present in the inductor flows into the storage capacitor (and the load), thereby to establish the potential at the output terminals. The step-up ratio of the translator is determined by the duration of time the switch is either open or closed; consequently an essentially constant predetermined output voltage may be maintained by controlling the switching time of the switch. In accordance with a specific embodiment of the circuit of this invention, this automatic control is provided by voltage and current feedback in conjunction with a relaxation oscillator to vary the switching time of a transistor switch.

Figure 2:
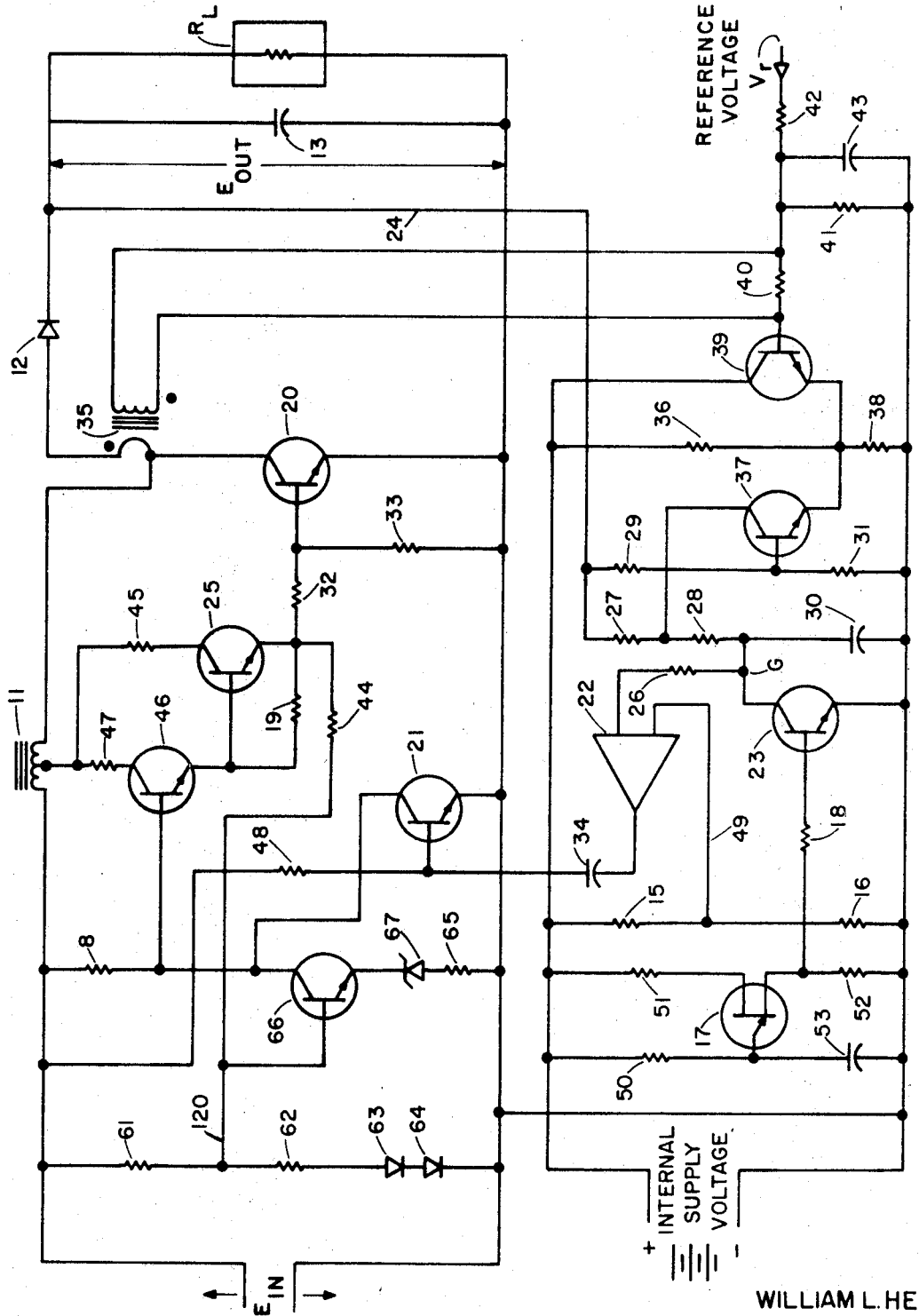

A complete understanding of the construction and operation of the invention, including all specific features thereof, may be had by reference to the following description taken in conjunction with the accompanying drawings, in which:

FIG. 1 is a simplified schematic of the present invention illustrating the principle of operation thereof; and FIG. 2 is a detailed schematic of the invention, depicting the voltage and current feedback technique and control of the switching time of transistor switch.

Referring now to FIG. 1, there is depicted the translator circuit 10 of the present invention, the basic elements of this circuit comprising an inductor 11, a P-N junction diode 12, a capacitor 13 in parallel with a load $R_L$, and a switch 14 with one end connected intermediate the inductor 11 and the diode 12, the other end connected to the ground potential terminal.

Assuming that the switch 14 is initially closed, a current builds up in the inductor 11 due to the input DC voltage $E_{IN}$ at the point A, this current being proportional to the input voltage and the duration the switch 14 remains closed. The energy stored in the inductor at the instant the switch 14 is opened is then proportional to the square of the current in the inductor times the value of the inductance. If the switch 14 is then opened, the voltage at the point B (the anode voltage of the diode 12) rises, and when this voltage exceeds that at point C (the cathode voltage of the diode 12), the diode 12 conducts, and current which was in the inductor at the time the switch was opened flows into the capacitor 13 (and the load $R_L$), raising the output voltage $E_{OUT}$ at the point C. The change in value of the output voltage $E_{OUT}$ is thus dependent upon the value of the current flowing into the capacitor 13, and the duration of time this current is allowed to flow when the switch 14 remains open. The current into the capacitor is equal to the current in the inductor minus the current in the load $R_L$.

For constant average output voltage $E_{OUT}$, the change in voltage across the capacitor during the time switch 14 is open must equal the negative of the change in voltage during the interval of time the switch 14 is closed. If we assume that the power losses of the system are negligible, the output voltage will seek a level such that the output current times the output voltage equals the input voltage times the input current. Analyzing the operation of the circuit of FIG. 1, it can be thus shown that the steady state voltage at point C ($E_{OUT}$) equals $E_{IN}$ times the ratio $T_2/T_1$ where $T_2$ is the total time of one cycle (for example, from the time when the switch opens to the time the switch opens again), and $T_1$ is the total time the switch 14 is open. The ratio $T_2/T_1$ thus determines the step-up factor of the circuit, and by automatically controlling this ratio (by controlling the "on" and "off" periods of the switch), the output voltage $E_{OUT}$ can be maintained at an essentially constant predetermined value.

FIG. 2 illustrates the schematic diagram of the preferred embodiment of the circuit which includes the switch and automatic control means for the switch, and which operates in accordance with the prior discussion. The transistor 20 provides the switch 14 shown in FIG. 1. When a positive current is drawn between the base and emitter, the transistor 20 conducts and appears as a short circuit and the switch is thereby "closed." Similarly when the transistor 20 is not conducting, it appears as an open circuit and the switch is thereby "open." Whether the transistor 20 conducts or is non-conducting is dependent upon the output of the operational amplifier 22, which in turn is dependent upon the voltage at the point G at the intersection of the resistors 26 and 28. When the voltage at the point G reaches a certain prescribed level $V_G$, the output of the operational amplifier 22 becomes negative, thus turning off transistor 21. This action causes the current through resistor 8 to flow entirely into the base of transistor 46 which causes transistor 25 to conduct, which consequently causes transistor 20 to conduct. The value of the prescribed level $V_G$ is just greater than the value of the voltage applied to the operational amplifier 22 by the lead 49.

Conversely, as long as the voltage at the point G remains below the prescribed level $V_G$, the transistor 21 conducts, and transistor 20 is consequently not conducting.

The basic frequency of operation of the transistor switch 20, and consequently the time cycle $T_2$, is established by the unijunction transistor 17, resistors 50, 51, and 52, and capacitor 53. These five components together provide a relaxation oscillator generating a sawtooth output and operating at a frequency $f_{T2} = 1_{T2}$. A pulse of sufficient magnitude generated by the relaxation oscillator turns on transistor 23, thereby reducing the voltage at G below the prescribed voltage $V_G$, turning off the transistor 20, and discharging the capacitor 30. As previously discussed, the non-conduction of the transistor 20 corresponds to the switch 14 of FIG. 1 being "open," and energy is thereby transferred into the capacitor 13 and load $R_L$.

The duration of time the transistor switch remains open is determined as follows. When the transistor 23 ceases to conduct, the capacitor 30 begins to charge, thereby raising the voltage at the point G. The rate of charging of this capacitor, and consequently the time $T_1$ for which the transistor switch 20 remains "open," is dependent upon the value of the voltage capacitor 13 and the current flow in the transistor 37. When the voltage $E_{OUT}$ is below the desired value, there is an absence or reduced amount of current flowing through the transistor 37, thereby resulting in an increased rate of charge of the capacitor 30. This increased rate of charge correspondingly reduces the time it takes for the voltage at G to reach the prescribed voltage $V_G$ to close the transistor switch 20, thus, reducing the time $T_1$. On the other hand, when the output voltage $E_{OUT}$ increases, the transistor 37 increases in conduction, thus requiring a longer period of time to charge capacitor 30 and reach the voltage $V_G$, thereby increasing the non-conduction period $T_1$ of transistor 20. The lead 24 thereby provides the necessary voltage feedback means for regulating the period $T_1$ of the expression $$E_{OUT} = \frac{T_2}{T_1} E_{IN}$$

Regulation of the switching period of the transistor 20 is also provided by current feedback furnished by transformer 35, transistor 39, and the associated resistors and capacitor shown in FIG. 2. Transistor 39 is connected with transistor 37 as a differential amplifier. As was previously described, an increase in load voltage $E_{OUT}$ results in the increased conduction of transistor 37, reducing the conduction time of transistor 20. Additionally, the increased current through the diode 12 will be sensed by the transformer 35, providing an out-of-phase voltage with the constant reference voltage $V_r$, the resulting reduced voltage appearing at the base of the transistor 39 and thereby reducing the conduction of transistor 39. This decreased conduction of transistor 39 consequently increases the conduction of transistor 37, thereby reducing the duration of conduction of transistor 20, as previously described. As a result of this combined voltage and current feedback, it is possible to thus maintain a specified output voltage irrespective of input voltage or load variations.

As an additional feature of the present invention, transistors 66, 46, and 25 are so interconnected with the transistor switch 20 to provide a drive current regulator for the transistor 20. A lead 120 is connected from the voltage divider network comprising the resistors and diodes 61, 62, 63, and 64 respectively, through the resistor 44 to the emitter of the transistor 25. Thus, a surge of high voltage $E_{IN}$ results in a correspondingly high voltage applied to the emitter of the transistor 25 to prevent overdriving the base of the transistor 20. Additionally, to reduce power consumption the high drive current required for the transistor 20 is derived from an intermediate or appropriately spaced tap on the inductor 11.

The circuit described in FIG. 2 may be built using conventional circuit components having desired values. While it is preferable to use solid state devices for the active circuit components, selected components may be of the vacuum tube variety. Additionally, the circuit of FIG. 2 may utilize integrated circuits of monolithic or hybird construction instead of discrete components for various functional parts of the circuit (for example, the relaxation oscillator, differential amplifier, etc.). In accordance with one construction of the circuit that has been built and tested, however, utilizing discrete components, an internal supply voltage of 12 volts, and an operating frequency $f_{T_2}(1/_{T_2})$ of approximately 10 kc. for the relaxation oscillator, a regulated output voltage of 75 volts was maintained for an input voltage varying from approximately 17 to 60 volts.

Various changes, modifications, and substitutions may be made to the above described circuit which are obvious to one ordinarily skilled in the art without departing from the spirit and scope of the invention.

What is claimed is:

1. A regulated DC step-up voltage device, comprising:
   (a) a pair of input terminals, and a pair of output terminals,
   (b) an inductor and diode in series relationship connected between one of the input terminals and one of the output terminals, the cathode of said diode connected with the said one output terminal,
   (c) a storage capacitor and load connected across the said pair of output terminals,
   (d) means for providing an input voltage of one value to said input terminals,
   (e) a first transistor having its emitter and collector connected between a point intermediate the diode and inductor and the other of the said input terminals,
   (f) first means for alternately applying and removing a pulse at the base of said first transistor, thereby to cause said first transistor to conduct and be non-conducting respectively, whereby when said first transistor is conducting, current builds up in said inductor due to said input voltage, and when said first transistor is nonconducting, a portion of said current present in said inductor flows into said storage capacitor, thereby to establish an output voltage at said output terminals, and
   (g) second means connected with said first means for controlling the application and duration of said pulse, said second means comprising a parallel combination of a capacitor and by-pass element, and means for altering the conduction of said by-pass element, thereby to alter the charging rate of said capacitor and to determine the value of said output voltage, said conduction altering means being responsive to voltage feedback means for detecting changes in said output voltage and current feedback means for detecting changes in current through said diode.

2. The circuit as described in claim 1 wherein said second means includes a relaxation oscillator for providing a periodic voltage pulse, the presence of said voltage pulse resulting in the removal of said pulse at the base of said first transistor, thereby to cause said first transistor to be non-conducting.

3. A voltage regulated DC step-up device comprising:
   (a) a pair of input terminals and a pair of output terminals,
   (b) an inductor and diode in series relationship connected between one input terminal and one output terminal, the cathode of said diode connected with the said one output terminal,
   (c) a storage capacitor and load connected across the said pair of output terminals,
   (d) a first transistor having its emitter connected with the other input terminal and its collector connected to the anode of the said diode,
   (e) a second and third transistor, the emitter of the second transistor coupled to the base of the said first transistor, the base of the second transistor coupled with the collector of the third transistor and to the said one input terminal,
   (f) an operational amplifier having an output terminal and an input terminal, the output terminal of the amplifier coupled with the base of the said third transistor,
   (g) first means coupled with said input terminal of said operational amplifier for periodically reducing a voltage pulse at said input terminal of said amplifier below a prescribed value, thereby to cause a voltage pulse at the said output terminal of said amplifier which results in said third transistor to be conducting, whereby when said third transistor is conducting, the said second and first transistors are non-conducting, and
   (h) second means furnishing voltage and current feedback coupled with said input terminal of said operational amplifier for providing a voltage pulse of said prescribed value at said input terminal of said amplifier, thereby to cause a voltage pulse at the said output terminal of said amplifier which results in said third transistor being non-conducting, whereby when said third transistor is non-conducting, the said second and first transistors are conducting,
   (i) said second means comprising:
      a second capacitor connected with said input terminal of said amplifier and a source of negative voltage, said capacitor also being coupled to said one output terminal through first and second resistors,
      a fourth transistor having its collector connected to a point intermediate said first and second resistors, its emitter coupled through a third resistor to said negative source voltage, and its base coupled to said negative source voltage and said one output terminal,
      a fifth transistor having its emitter connected with the emitter of said fourth transistor, and its collector connected with a source of positive voltage, and
      a transformer coupled with the base of said fifth transistor for sensing current changes through the said diode.

4. The circuit as described in claim 3 wherein the said first means includes a unijunction relaxation oscillator and a sixth transistor, the base of the said sixth transistor coupled with the output of the said relaxation oscillator, the emitter of the sixth transistor coupled with the source of negative supply voltage, and the collector of the sixth transistor is coupled with the input terminal of the said operational amplifier.

5. The circuit as described in claim 4 including a seventh transistor whose emitter is connected with the base of the said first transistor, whose base is coupled with the emitter of the said second transistor; the collectors of the second and seventh transistors being coupled to an intermediate tap point of the said inductor.

6. The circuit as described in claim 5 including a voltage divider network coupled between the said input terminals, and an eighth transistor having its emitter connected through a Zener diode to said other of said input terminal, its base connected to said voltage divider network and to said base of said first transistor, and its collector connected with the collector of said third transistor and the base of said second transistor.

7. A voltage regulated step-up apparatus of the type including an input portion comprising a pair of input terminals, and an inductor connected to one of said input terminals; an output portion comprising a pair of output terminals, a forward-biased diode having its cathode coupled to one of said output terminals, and a capacitor and load connected across said output terminals; and switch means between said input and output portions having one end connected to a point between said inductor and the anode of said diode, the other end coupled to the others of said input and output terminals, comprising:
   (a) control means coupled to said switch for alternately applying and removing an output signal to said switch means, thereby to correspondingly actuate or deactuate said switch, whereby when said switch is actuated, current builds up in said inductor, and when said switch is deactuated, energy is transferred from said input portion to said output portion,
   (b) voltage feedback means coupled to said one of said output terminals and to said control means for controlling the output signal from said control means in response to the value of the output voltage across said output terminals, and
   (c) current feedback means coupled to said output portion for sensing the output current through said diode for additionally controlling the output signal from said control means in response to the value of said output current.

8. The apparatus as described in claim 7 wherein said current feedback means comprises a current transformer.

9. The apparatus as described in claim 7 wherein said control means comprises a by-pass active element connected across and in parallel with a second capacitor, and the voltage and current feedback means controls the extent of conduction of said by-pass active element, thereby to correspondingly affect the charging rate of the second capacitor and the resulting output signal from said control means, whereby increases in either voltage across said output terminals or output current above a prescribed value increases the period of time the switch is deactuated.

10. The apparatus as described in claim 9 including separate means for periodically discharging said second capacitor.

11. The apparatus as described in claim 10 wherein said separate means comprises a relaxation oscillator.

References Cited

UNITED STATES PATENTS 3,263,099  7/1966  Bedford.
3,381,202  4/1968  Louks et al. _____ 321—2

J. D. MILLER, Primary Examiner

G. GOLDBERG, Assistant Examiner

U.S. Cl. X.R.

321—2